Patented Oct. 24, 1944

2,360,865

UNITED STATES PATENT OFFICE 2,360,865

SOFTENERS FOR COPOLYMERS OF BUTADIENE HYDROCARBONS AND ALPHA METHYLENE NITRILES

Benjamin S. Garvey, Akron, Ohio, assignor to The B. F. Goodrich Company, New York, N. Y., a corporation of New York No Drawing. Application August 26, 1941, Serial No. 408,354

3 Claims. (Cl. 260—36)

This invention relates to a new class of softeners for copolymers of butadiene hydrocarbons and alpha methylene nitriles and to the improved compositions obtainable by the use of such softeners.

The softening of synthetic rubber has in general presented problems not encountered in the softening of natural rubber due to differences in behavior on mill rolls, incompatability of synthetic rubber with certain softening materials commonly employed in natural rubber and other differences in properties. It has been particularly difficult to find satisfactory softeners for the processing of the oil-resisting synthetic rubbers prepared by the copolymerization of a butadiene hydrocarbon such as butadiene-1,3 and an alpha methylene nitrile such as acrylonitrile. The problem is further complicated by the fact that some softeners for copolymers prepared by copolymerizing butadiene and acrylonitrile in one ratio are not satisfactory materials for use with copolymers of a different composition. For example, synthetic rubber prepared by copolymerizing 55 parts by weight of butadiene and 45 parts by weight of acrylonitrile is not satisfactorily softened by some of the most useful softeners for copolymers prepared from 75 parts of butadiene and 25 parts of acrylonitrile. Aside from these difficulties, some softeners which are compatible with this type of synthetic rubber so adversely affect the properties of vulcanizates prepared from compositions containing them as to preclude their use.

I have now discovered a class of softeners which are compatible with and which greatly improve the processing of any of the synthetic rubbers prepared by the copolymerization of a butadiene hydrocarbon and an alpha methylene nitrile and which enables both unvulcanized and vulcanized synthetic rubber compositions of desirable properties to be produced.

This class of softeners comprises monoketones containing from 6 to 10 carbon atoms, inclusive, such compounds being characterized by the presence of a single $$-\overset{\parallel}{\underset{O}{C}}-$$

group bonded by each of the disconnected valencies to a hydrocarbon residue. Included in this class of compounds are simple aliphatic ketones containing from 6 to 10 carbon atoms such as di-n-propyl ketone (butyrone), di-isopropyl ketone and di-isobutyl ketone; mixed aliphatic ketones containing from 6 to 10 carbon atoms such as methyl secbutyl ketone, pinacolin, methyl hexyl ketone, methyl heptyl ketone, methyl tert-amyl ketone; ethyl n-butyl ketone, isopropyl n-butyl ketone, ethyl tert-amyl ketone and the like; olefin ketones containing from 6 to 10 carbon atoms such as propyl allyl ketone, ethyl propenyl ketone, isobutylidene acetone, isoamylidene acetone, mesityl oxide, methyl heptenone and the like; 6 to 10 carbon atom diolefin ketones such as phorone (2,6-dimethyl $\Delta$2,5-heptadiene-4-one), sorbic ethyl ketone ($\Delta$2,4 octadiene-6-one), 3 methyl $\Delta$2,4-octadiene-6-one and the like; alicyclic ketones containing from six to ten carbon atoms including both the ring ketones and the exocyclic ketones of the unsaturated as well as saturated alicyclic hydrocarbons such as cyclohexanone, methyl cyclohexanones, dimethyl cyclohexanones, ethyl cyclohexanones, propyl cyclohexanones, methyl cyclopentanones, dimethyl cyclopentanones, methyl ethyl cyclopentanones, allyl cyclohexanone, 1,4-isopropylidene cyclohexanone, methyl cyclohexenones, dimethyl cyclohexenones, isophorone (3,5,5-trimethyl $\Delta^2$ cyclohexenone), acetyl cyclopentane, $\Delta^1$ cyclopentenyl acetone, acetyl cyclohexane, $\Delta^1$ tetrahydro acetophenone, $\Delta^1$ cyclohexenyl acetone, cyclohexylidene acetone, menthone, piperitone, camphor, fenchone, thujone, carone and the like; the aromatic ketones containing from 6 to 10 carbon atoms such as acetophenone, methyl benzyl ketone and the like and mixtures of such 6–10 carbon atom ketones.

Most of the softeners in this class are liquids or low melting solids having a boiling point ranging from about 130° C. to about 225° C. or higher. Since compounds boiling lower than about 150° C. are too volatile for commercial use as softeners, those ketones boiling above 150° C. and particularly those boiling from 175–225° C. are preferred. Ketones which are comparatively inexpensive and which are commercially available such as acetophenone, cyclohexanone, phorone, isophorone, camphor etc., are especially desirable for use in this invention. Mixtures of ketones obtained in commercial operations which consist predominently of 6–10 carbon atom ketones and which boil within the preferred range are also desirable softeners.

As mentioned hereinabove the ketone softeners of this invention may be employed in any of the synthetic rubbers prepared by the copolymerization of a butadiene hydrocarbon and an alpha methylene nitrile. Although synthetic rubbers prepared by copolymerizing butadiene-1,3 and acrylonitrile in the ratios: 75 parts butadiene–25 parts acrylonitrile, 67 parts butadiene–33 parts acrylonitrile and 55 parts butadiene–45 parts acrylonitrile are commercially available and are preferred, synthetic rubbers prepared from these monomers in other proportions as well as synthetic rubbers prepared from one or more other butadiene-1,3 hydrocarbons such as isoprene, 2,3-dimethyl butadiene-1,3 piperylene and the like and one or more other alpha methylene nitriles of the formula

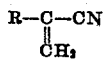

where R is an alkyl group such as methyl, ethyl or propyl, may also be softened effectively by ketones containing from 6–10 carbon atoms.

The softeners of this invention are particularly useful where it is desirable to produce a very plastic, easily processed, unvulcanized stock which may be cured to a vulcanizate having high durometer hardness and the excellent oil resistance of the unsoftened synthetic rubber. This combination of desirable properties in both the unvulcanized and vulcanized compositions is difficult to obtain with most softeners since softeners which give very plastic unvulcanized stocks generally lower the hardness and/or the oil resistance of vulcanized stock. On the other hand softeners which do not affect these properties in the vulcanizers are ordinarily not effective in producing extremely plastic, easily processed unvulcanized stocks.

The incorporation of the softener with the synthetic rubber may be effected by any desired method as by adding the softener to synthetic rubber, while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent.

The amount of the softener added will depend upon the properties desired in the composition and upon the nature of the rubber treated, the rubber and the softener being compatible over a wide range of proportions. In commercial operations it will ordinarily be expedient to employ from about 10 to 60 parts by weight of the softener for each 100 parts of synthetic rubber, but amounts smaller or larger than this ranging from 1 to 100 parts of the softener for 100 parts of synthetic rubber are also effective.

The use of the softeners of this invention may be illustrated by the following specific examples:

*Example 1*

10.0 parts by weight of a synthetic rubber prepared by copolymerizing in aqueous emulsion 75 parts by weight of butadiene and 25 parts by weight of acrylonitrile are sheeted out on a tightly set mixing mill. 25 parts by weight of acetophenone are added as milling is continued. The softener mixes readily with the synthetic rubber and a smooth well softened batch is obtained after only five minutes additional milling. The softened batch is easily processed, is fairly tacky and takes up the conventional pigments and vulcanizing ingredients quite easily. When the batch is compounded and vulcanized, vulcanizates having high durometer hardness and excellent oil resistance are obtained.

*Example 2*

50 parts by weight of cyclohexanone are incorporated on a mixing mill in 100 parts by weight of a synthetic rubber prepared by copolymerizing in aqueous emulsion 55 parts of butadiene and 45 parts of acrylonitrile. The softener adds easily in only 12 minutes to produce a very soft batch. When the batch is mixed with pigments and vulcanizing ingredients, all of which are easily dispersed in the stock, and then vulcanized, a vulcanizate having a durometer hardness of 55, and a Shopper rebound of 42 is obtained. The vulcanizate is also exceedingly oil resistant, there being no volume change in the vulcanizate when it is immersed in hexane for 48 hours.

*Example 3*

50 parts by weight of phorone are incorporated in 100 parts of synthetic rubber prepared by copolymerizing 55 parts by weight of butadiene and 45 parts of acrylonitrile. The softener adds easily in only 13 minutes to produce an extremely soft plastic batch which is fairly tacky. The batch is very easily processed and takes up pigments quite readily. It may be vulcanized to oil resistant vulcanizates of desirable physical properties.

*Example 4*

Example 3 is repeated using 50 parts of isophorone as the softener. The softener improves processing and produces a soft plastic batch which may be compounded and vulcanized to yield vulcanizates having excellent oil resistance and high durometer hardness.

*Example 5*

50 parts by weight of camphor are incorporated into a copolymer prepared from 55 parts of butadiene and 45 parts of acrylonitrile. Only 10 minutes are required to add the softener. The softened batch is easily processed, is very plastic and when compounded and cured, it yields vulcanizates of excellent tensile strength, elongation, durometer hardness and oil resistance.

It is to be understood that the above examples have been cited by way of illustration only and are not intended to limit this invention in any respect. Other softeners in this class may be incorporated in synthetic rubber prepared from butadiene hydrocarbons and alpha methylene nitriles to produce excellent unvulcanized and vulcanized compositions. Other materials such as natural rubber, other softeners, pigments, fillers, vulcanizing agents, accelerators, antioxidants and the like may be included in the compositions herein described. Still other modifications which will be apparent to those skilled in the art are also within the spirit and scope of the invention as defined by the appended claims.

I claim:

1. A composition of matter comprising a synthetic rubber prepared by copolymerizing a butadiene-1,3 hydrocarbon and an alpha-methylene nitrile of the formula

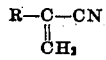

wherein R is a member of the class consisting of hydrogen and alkyl radicals containing from 1 to 3 carbon atoms, and, as a softener therefor, a ketone selected from the class consisting of phorone and isophorone.

2. A composition of matter comprising a synthetic rubber prepared by copolymerizing butadiene-1,3 and acrylonitrile and, as a softener therefor, phorone.

3. A composition of matter comprising a synthetic rubber prepared by copolymerizing butadiene-1,3 and acrylonitrile and, as a softener therefor, isophorone.

BENJAMIN S. GARVEY.

CERTIFICATE OF CORRECTION.

Patent No. 2,360,865. October 24, 1944.

BENJAMIN S. GARVEY.

It is hereby certified that error appears in the printed specification of the above numbered patent requiring correction as follows: Page 2, first column, line 21-22, for the word "vulcanizers" read --vulcanizate--; line 28, after "rubber" strike out the comma; and second column, line 3, for "rebound" read --Rebound--; and that the said Letters Patent should be read with this correction therein that the same may conform to the record of the case in the Patent Office.

Signed and sealed this 30th day of January, A. D. 1945.

Leslie Frazer (Seal)  Acting Commissioner of Patents.